(12) United States Patent
Kim et al.

(10) Patent No.: US 7,327,912 B2
(45) Date of Patent: Feb. 5, 2008

(54) WAVELENGTH DIVISION MULTIPLEXER/DEMULTIPLEXER

(75) Inventors: Young-Hoon Kim, Seoul (KR); Sun-Tae Jung, Anyang (KR); Dong-Kyoon Han, Songnam (KR)

(73) Assignee: Samsung Electronics Co, Ltd., Suwon-Si, Gyeonggi-Do (KR)

( * ) Notice: Subject to any disclaimer, the term of this patent is extended or adjusted under 35 U.S.C. 154(b) by 438 days.

(21) Appl. No.: 10/607,466

(22) Filed: Jun. 26, 2003

(65) Prior Publication Data

US 2004/0101243 A1    May 27, 2004

(30) Foreign Application Priority Data

Nov. 25, 2002    (KR) .................. 10-2002-0073406

(51) Int. Cl.
G02B 6/26    (2006.01)
(52) U.S. Cl. .................. 385/15; 385/37; 385/24; 385/43; 385/39
(58) Field of Classification Search ............ 385/37, 385/31, 43, 46
See application file for complete search history.

(56) References Cited

U.S. PATENT DOCUMENTS 5,917,972 A * 6/1999 Davies .................. 385/43
6,049,644 A * 4/2000 Dragone .................. 385/37
6,563,988 B2 * 5/2003 McGreer .................. 385/43
2002/0154863 A1 * 10/2002 Mizuno et al. ............ 385/43
2002/0159703 A1   10/2002 McGreer et al. ............ 385/43
2003/0063891 A1 * 4/2003 Kim .................. 385/140
2004/0001663 A1 * 1/2004 Vodrahalli et al. ............ 385/15

FOREIGN PATENT DOCUMENTS

EP    0881512 A2    12/1998
EP    1076248 A1    4/1999

* cited by examiner

Primary Examiner—Frank G. Font
Assistant Examiner—Eric Wong
(74) Attorney, Agent, or Firm—Cha & Reiter, LLC

(57) ABSTRACT

Disclosed is a wavelength division multiplexer/demultiplexer having a grating for demultiplexing a multiplexed optical signal, an input waveguide and an output waveguides. The input waveguide comprises a first sub-waveguide having a width that gradually increases in a progressing direction of the optical signal and a second sub-waveguide having a width that gradually decreases in the progressing direction of the optical signal passing through the first sub-waveguide. Since the inputted optical signal within the increased portion of the input waveguide has an expended bandwidth and the inputted optical signal within the decreased portion of the input waveguide has a reduced side lobe, an interference effect is prevented, which may be generated between neighboring channels, and improves quality of the optical signal transmitted and received in a wavelength division multiplexed (WDM) optical communication network.

7 Claims, 8 Drawing Sheets

WAVELENGTH DIVISION MULTIPLEXER/DEMULTIPLEXER

CLAIM OF PRIORITY

This application claims priority to an application entitled "WAVELENGTH DIVISION MULTIPLEXER/DEMULTIPLEXER," filed in the Korean Intellectual Property Office on Nov. 25, 2002 and assigned Serial No. 2002-73406, the contents of which are hereby incorporated by reference.

BACKGROUND OF THE INVENTION

1. Field of the Invention

The present invention relates to an optical communication device used in wavelength division multiplexing (WDM) optical communication networks, and more particularly to a wavelength division multiplexer/demultiplexer for multiplexing/demultiplexing optical signals.

2. Description of the Related Art

Generally, WDM optical communication networks are used to transmit large amounts of data, the optical signals, which include multiple channels, are simultaneously transmitted using a single strand of optical fiber. A transmitting terminal within the WDM network serves to multiplex an optical signal. A receiving terminal within the WDM network serves to receive the multiplexed optical signal and separate it into optical signals of different wavelengths as well as to change the received optical signal into respective electrical signals. In a WDM optical communication network based on a single-mode optical fiber, an Arrayed Waveguide Grating (AWG) (using a planar lightwave circuit (PLC) technique) is used in the wavelength division multiplexer/demultiplexer. The planer lightwave circuit comprises a substrate made of silicon or quartz, and a plurality of silica layers or polymer thin films deposited on the substrate.

In demultiplexing the optical signal, the shape of the input waveguide of the multiplexed optical signal determines the bandwidth and quality of the optical signal.

FIG. 1 is a schematic of an input waveguide of a conventional wavelength division multiplexer/demultiplexer. As shown in FIG. 1, the input waveguide 313 of the conventional wavelength division multiplexer/demultiplexer inputs a multiplexed optical signal to a grating of the wavelength division multiplexer/demultiplexer. However, when the wavelength division multiplexer/demultiplexer is operated as a demultiplexer, the input waveguide 313 outputs the multiplexed optical signal.

The input waveguide 313 has a parabolic horn shape, in which its width ($W_1$) is gradually increased in a progressing direction of the optical signal. Variation of width ($W_1$) of the input waveguide 313 is defined below by Equation 1, and the shape of input waveguide 313 is defined below by Equation 2.

$$\frac{1}{2}\frac{dW_1}{dz} = -\gamma \frac{4\pi}{3}\frac{\lambda_g}{W_{i1}} \quad \text{[Equation 1]}$$

$$W_1 = (2\alpha\lambda_g z_1 + W_{i1}^2)^{1/2}, \; \alpha = -\frac{8\pi\gamma}{3} \quad \text{[Equation 2]}$$

Herein, $z_1$ denotes the distance from an input terminal of input waveguide 31 to a position of the progressing optical signal. $W_1$ is the width of input waveguide 313 at the position of the progressing optical signal. $W_{i1}$ is the width of input waveguide 313 at the input terminal. $\lambda_g$ denotes the effective wavelength of the optical signal and $\gamma$ denotes the coupling coefficient of the fundamental and higher modes of the optical signal.

When the multiplexed optical signal progresses along the parabolic horn type input waveguide 313, mode coupling of the optical signal from the fundamental mode to the secondary mode or the higher mode occurs. In addition, the bandwidth of the optical signal is expanded. Consequently, the optical signal has a flat field profile. Equation 3 below illustrates a relationship between the coupling coefficient created by the optical signal progressing along input waveguide 313 and the maximum value of power ($P_j$) of the optical signal coupled from the fundamental mode to the higher mode. FIG. 5 is a graph illustrating the power ($P_j$) profile of the coupled optical signal from the fundamental mode to the higher mode as the multiplexed optical signal progresses along input waveguide 313.

$$\frac{P_j}{P_0} = \frac{4\gamma^2}{4\gamma^2 + 1} = \frac{(3\alpha/4\pi)^2}{(3\alpha/4\pi)^2 + 1} \quad \text{[Equation 3]}$$

Herein, $P_j$ denotes the power of an optical signal coupled from the fundamental mode to the higher mode. $P_0$ denotes the power of an optical signal initially inputted to input waveguide 313. As shown in Equation 3 and FIG. 5, the power ($P_j$) of the optical signal coupled from the fundamental mode to the higher mode varies according to the width ($W_{i1}$) of input waveguide 313 at the input terminal and the width ($W_1$) of input waveguide 313 at a certain position.

Such a conventional parabolic horn type input waveguide 313 has several limitations. In particular, as the bandwidth of the optical signal expands, interference of the optical signal occurs from an optical signal of a neighboring channel. Thus, the quality of the optical signal is depreciated. Further, since mode coupling of the optical signal from the fundamental mode to the higher mode occurs, a side lobe is generated. The interference between the neighboring channels generated by the side lobe is a leading factor depreciating the quality of the optical signal.

SUMMARY OF THE INVENTION

Therefore, the present invention reduces or overcome many of the above problems. One object of the present invention is to provide a wavelength division multiplexer/demultiplexer with an input waveguide having a designated configuration. This configuration is such that a side lobe generated by the mode coupling from the fundamental mode to the higher mode is reduced. Thus, enabling the expansion of the bandwidth of the multiplexed optical signal and preventing quality deterioration of the signal during demultiplexing.

In accordance with one aspect of the present invention, a wavelength division multiplexer/demultiplexer is provided with a grating for demultiplexing a multiplexed optical signal to single-channel optical signals, an input waveguide for inputting the optical signal to the grating, and output waveguides for outputting the optical signals demultiplexed by the grating, wherein the input waveguide comprises, a first sub-waveguide having a width that gradually increases in a progressing direction of the optical signal, and a second sub-waveguide having a width that gradually decreases in the progressing direction of the optical signal passing through the first sub-waveguide.

In accordance with another aspect of the present invention, a wavelength division multiplexer/demultiplexer is provided for used in a planar lightwave circuit (PLC) with an arrayed waveguide grating having a plurality of optical waveguides, an input waveguide for inputting a multiplexed optical signal to the grating, and output waveguides for outputting single-channel optical signals demultiplexed by the grating, wherein the input waveguide comprises a first sub-waveguide having a width that gradually increases in a progressing direction of the optical signal, and a second sub-waveguide having a width that gradually decreases in the progressing direction of the optical signal passing through the first sub-waveguide.

BRIEF DESCRIPTION OF THE DRAWINGS

The present invention will be more clearly understood from the following detailed description taken in conjunction with the accompanying drawings, in which.

DETAILED DESCRIPTION OF THE PREFERRED EMBODIMENTS

Figure 1:
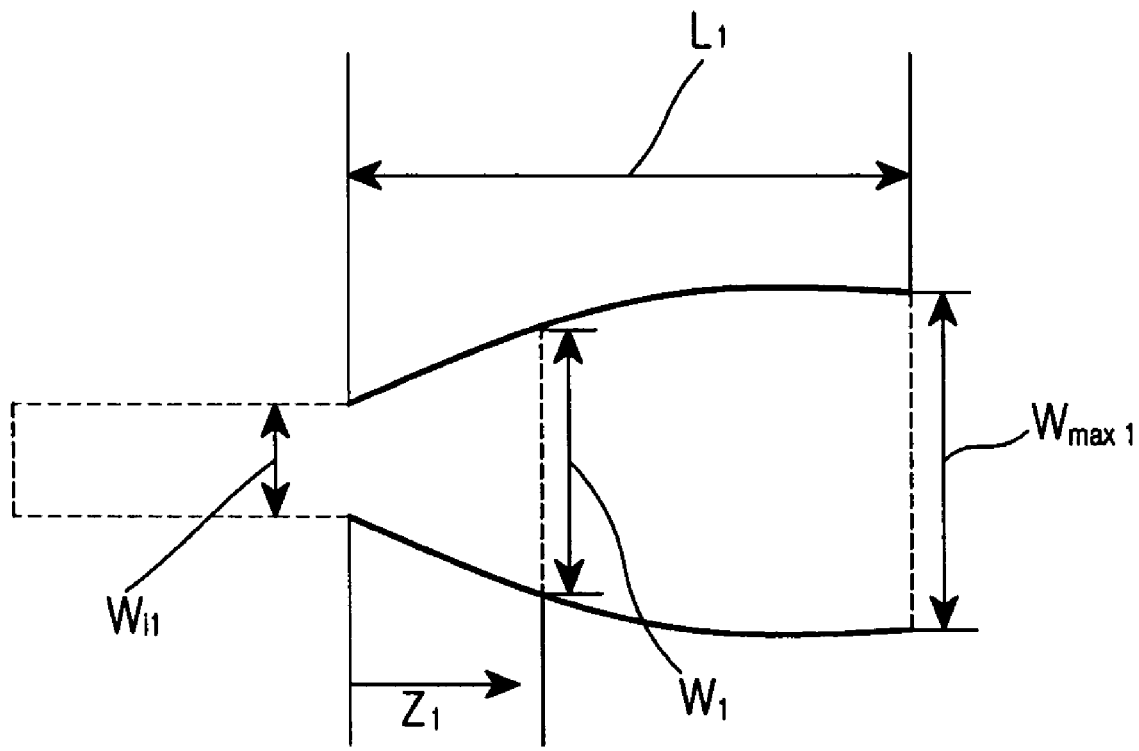
FIG. 1 is a schematic diagram of an input waveguide of a conventional wavelength division multiplexer/demultiplexer.

In the following description of the present invention, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. Moreover, it will be recognized that certain aspects of the figures are simplified for explanation purposes and that the full system environment for the invention will comprise many known functions and configurations all of which need not be shown here. In the drawings, the same or similar elements are denoted by the same reference numerals even though they are depicted in different drawings.

Figure 2:
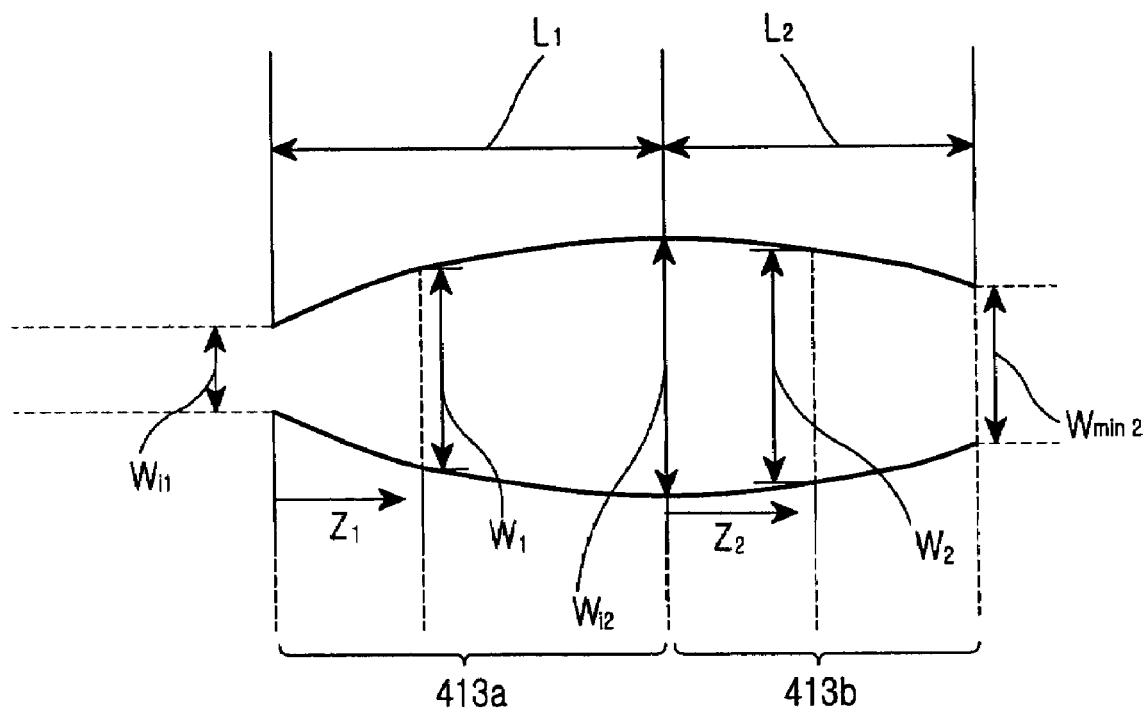
FIG. 2 is a schematic diagram of an input waveguide of a wavelength division multiplexer/demultiplexer in accordance with a preferred embodiment of the present invention.

FIG. 2 shows an input waveguide 413 of a wavelength division multiplexer/demultiplexer in accordance with a preferred embodiment of the present invention. As shown in FIG. 2, input waveguide 413 of the wavelength division multiplexer/demultiplexer comprises a first sub-waveguide 413a and a second sub-waveguide 413b. First sub-waveguide 413a has a parabolic horn shape, in which its width ($W_1$) is gradually increased in a progressing direction of an optical signal. Second sub-waveguide 413b is extended from an end of the first sub-waveguide 413a and has a designated shape, in which its width ($W_2$) is gradually decreased in a progressing direction of the optical signal passing through first sub-waveguide 413a.

As noted, first sub-waveguide 413a has the parabolic horn shape, in which its width ($W_1$) is gradually increased in the progressing direction of the optical signal, and the shape of first sub-waveguide 413a is defined below by Equation 4.

$$W_1 = (2\alpha\lambda_g z_1 + W_{i1}^2)^{1/2}, \alpha = -\frac{8\pi\gamma}{3} \quad \text{[Equation 4]}$$

Herein, $z_1$ denotes the distance from an input terminal of the first sub-waveguide 413a to a position of a progressing optical signal. $W_1$ is the width of the first sub-waveguide 413a at the position of the progressing optical signal. $W_{i1}$ is the width of the first sub-waveguide 413a at the input terminal. $\lambda_g$ denotes the effective wavelength of the optical signal, and $\gamma$ denotes the coupling coefficient of the fundamental and higher modes of the optical signal.

When a multiplexed optical signal progresses along the parabolic horn type first sub-waveguide 413a, the mode coupling of the optical signal from the fundamental mode to the higher mode more than the secondary mode occurs, and the bandwidth of the optical signal is expanded. Further, upon the mode coupling of the optical signal from the fundamental mode to the higher mode, the optical signal has a flat field profile.

Second sub-waveguide 413b has a designated shape, in which its width ($W_2$) is gradually decreased in the progressing direction of the optical signal. The shape of second sub-waveguide 413b is variously defined below by Equations 5 to 7.

$$W_2 = (W_{i2}^2 - 2\alpha\lambda_g z_2)^{1/2}, \alpha = -\frac{8\pi\gamma}{3} \quad \text{[Equation 5]}$$

$$W_2 = \gamma\left[1 - \exp\left(\frac{-z_2}{\alpha}\right)\right] + W_{i2}, \alpha = -\frac{8\pi\gamma}{3} \quad \text{[Equation 6]}$$

$$W_2 = 2\alpha z_2 + W_{i2}, \alpha = -\frac{8\pi\gamma}{3} \quad \text{[Equation 7]}$$

In the above Equations 5 to 7, $z_2$ denotes the distance from the end of the first sub-waveguide 413a to a position of a progressing optical signal. $W_2$ is the width of the second sub-waveguide 413b at the position of the progressing optical signal. $W_{i2}$ is the width of the second sub-waveguide 413b at the contact point of the first and second sub-waveguides 413a and 413b. $\lambda_g$ denotes the effective wavelength of the optical signal, and $\gamma$ denotes the coupling coefficient of the fundamental and higher modes of the optical signal.

As provided by Equation 5, second sub-waveguide 413b has a parabolic horn shape, in which its width ($W_2$) is gradually decreased in the progressing direction of the optical signal. As provided by Equation 6, second sub-waveguide 413b has a tapered shape, in which its width ($W_2$) is gradually decreased in the progressing direction of the optical signal along a curve of an exponential function. Further, as provided by Equation 7, second sub-waveguide 413b has a tapered shape, in which the width ($W_2$) is linearly decreased in the progressing direction of the optical signal.

First sub-waveguide 413a is shaped such that its width ($W_1$) is gradually increased in the progressing direction of the optical signal. Therefore, in the first sub-waveguide 413a, the mode coupling of an input multiplexed optical signal from the fundamental mode to the higher mode occurs, and a bandwidth of the optical signal is expanded. Herein, the expanded bandwidth of the multiplexed optical signal is assured, but the optical signal is interfered with an optical signal of a neighboring channel due to a side lobe generated by the higher mode. Therefore, quality of the optical signal within first sub-waveguide 413a is deteriorated.

The optical signal passing through first sub-waveguide 413a is inputted to second sub-waveguide 413b.

As noted above, second sub-waveguide 413b is shaped such that its width ($W_2$) is gradually decreased in a progressing direction of the optical signal, and the shape of second sub-waveguide 413b is variously defined by Equations 5 to 7.

Since the width ($W_1$) of first sub-waveguide 413a is gradually increased in the progressing direction of the optical signal, the mode coupling of the optical signal from the fundamental mode to the higher mode occurs within first sub-waveguide 413a. On the other hand, since the width ($W_2$) of second sub-waveguide 413b is gradually decreased in the progressing direction of the optical signal, the mode coupling of the optical signal from the higher mode to the fundamental mode occurs within second sub-waveguide 413b. Therefore, the side lobe generated by the higher mode optical signal in the high mode is reduced.

The bandwidth of the optical signal passing through first and second sub-waveguides 413a and 413b and received by a grating of the wavelength division multiplexer/demultiplexer is determined by a width ($W_{min2}$) of an end of second sub-waveguide 413b. Thus, the bandwidth of the multiplexed optical signal received by the wavelength division multiplexer/demultiplexer is sufficiently assured by adjusting the width ($W_{min2}$) of the end of second sub-waveguide 413b. Simultaneously, the side lobe causing the interference with the neighboring channels is reduced.

Figure 3:
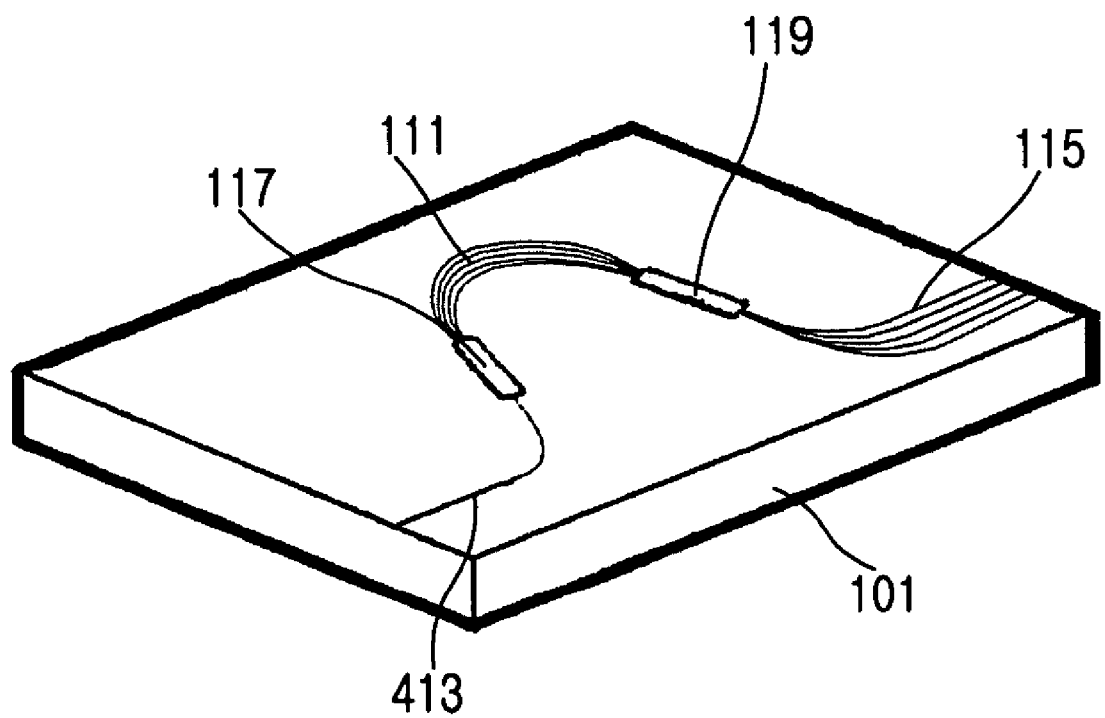
FIG. 3 is a perspective view of one example of a wavelength division multiplexer/demultiplexer employing the input waveguide of FIG. 2.

FIG. 3 is a perspective view of one example of a wavelength division multiplexer/demultiplexer employing the input waveguide of FIG. 2. As shown in FIG. 3, wavelength division multiplexer/demultiplexer 100 comprises a substrate 101 made of silicon or quartz, an arrayed waveguide grating 111 formed on the substrate 101, an input waveguide 413 formed on one side of the substrate 101, and a plurality of output waveguides 115 formed on the other side of the substrate 101. Slab waveguides 117 and 119 are respectively formed between input waveguide 413 and arrayed waveguide grating 111 and between output waveguides 115 and arrayed waveguide grating 111.

A demultiplexing function is performed when a multiplexed optical signal is received by wavelength division multiplexer/demultiplexer 100 via input waveguide 413 and then outputted via output waveguides 115. In particular, the received multiplexed optical signal is demultiplexed into respective channels by the arrayed waveguide grating 111 and outputted from wavelength multiplexer/demultiplexer 100 via the respective output waveguides 115.

Conversely, multiplexing function is performed when a plurality of optical signals with different wavelengths is received by the wavelength division multiplexer/demultiplexer 100 via output waveguides 115 and then outputted via input waveguide 413. In particular, single-channel optical signals are inputted and multiplexed into a multi-channel optical signal by the arrayed waveguide grating 111 and outputted from wavelength multiplexer/demultiplexer 100 via input waveguide 413.

Figure 4:
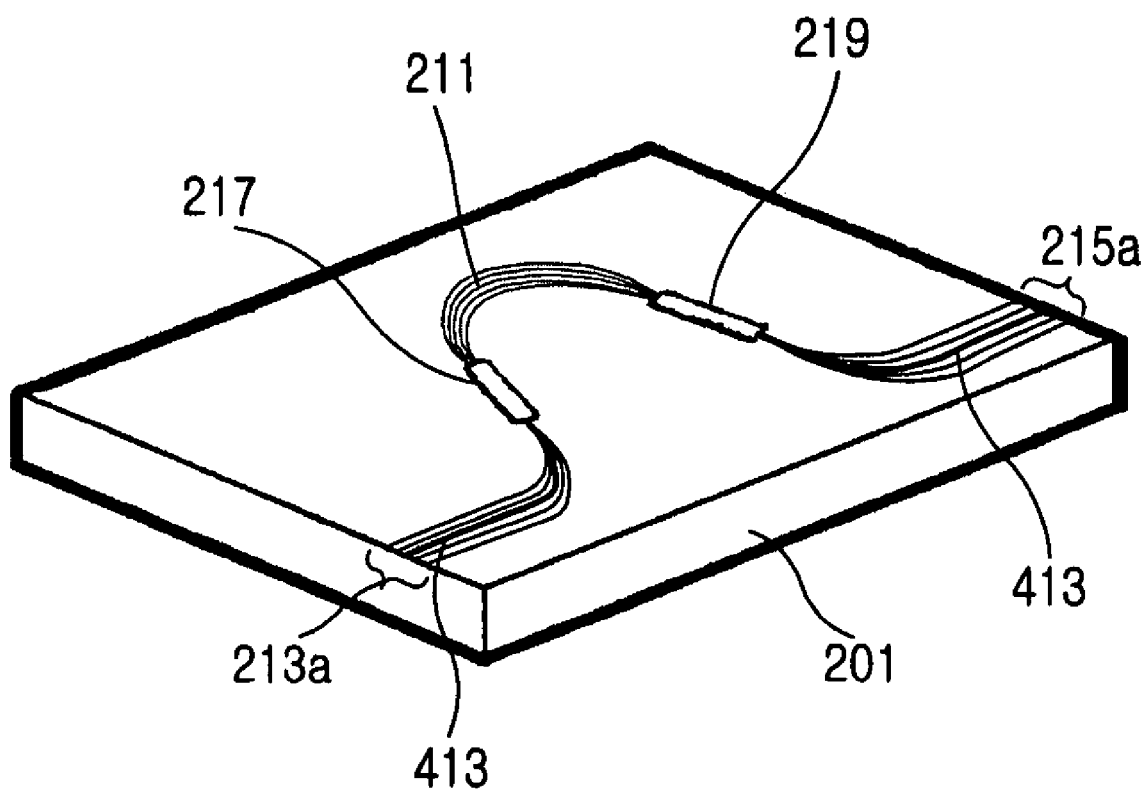
FIG. 4 is a perspective view of another example of a wavelength division multiplexer/demultiplexer employing the input waveguide of FIG. 2.
Figure 5:
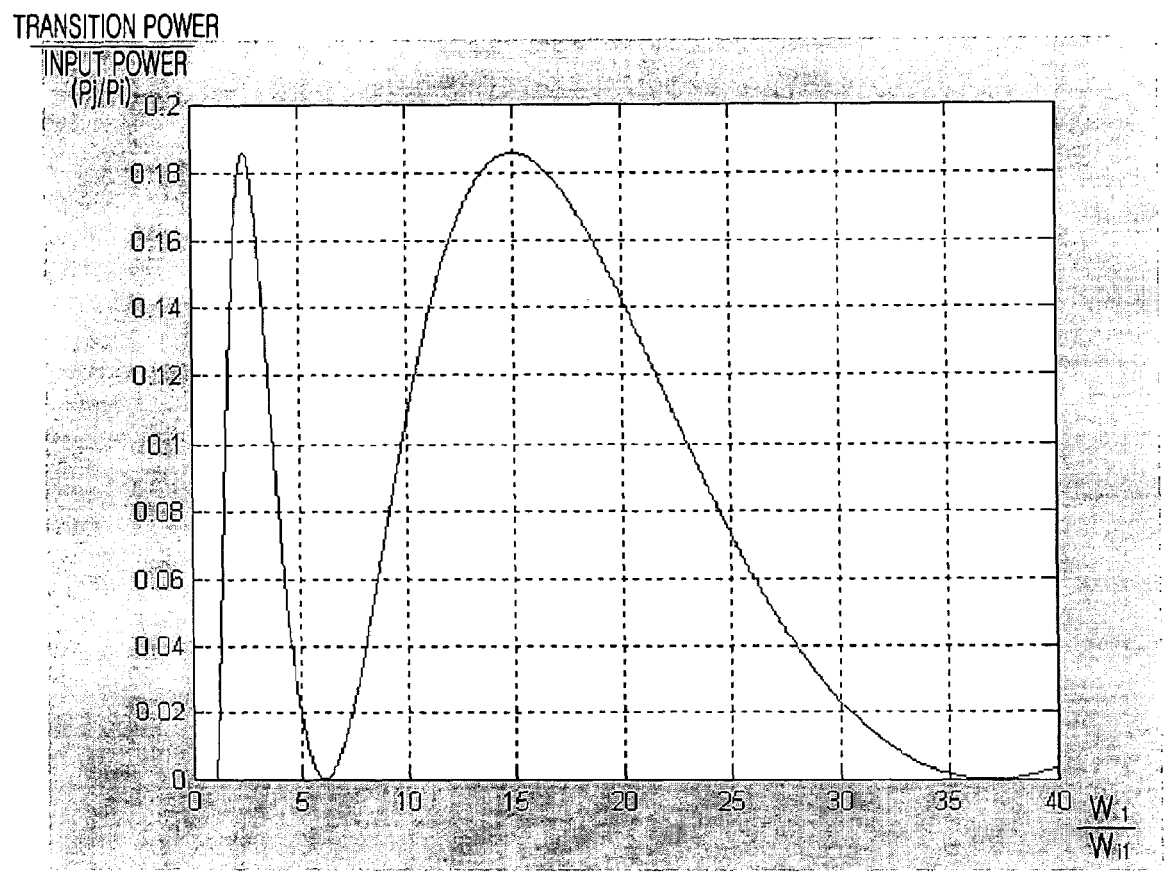
FIG. 5 is a graph illustrating the operating characteristics of the input waveguide of the conventional wavelength division multiplexer/demultiplexer of FIG. 1.

FIG. 4 is a perspective view of another example of a wavelength division multiplexer/demultiplexer employing the input waveguide of FIG. 2, and more particularly a bi-directional wavelength division multiplexer/demultiplexer employing the input waveguide of FIG. 2. As shown in FIG. 4, bi-directional wavelength division multiplexer/demultiplexer 200 comprises a substrate 201 made of silicon or quartz, an arrayed waveguide grating 211 formed on the substrate 101, a plurality of waveguides 213a and 215a respectively formed on both sides of the substrate 201. Slab waveguides 217 and 219 are respectively formed between the arrayed waveguide grating 211 and waveguides 213a and between arrayed waveguide grating 211 and waveguides 215a. Waveguides 213a and 215a include a multi-channel waveguide 413 for transmitting a multiplexed optical signal and single-channel waveguides for transmitting a single-channel signal.

A multiplexed optical signal received via multi-channel waveguide 413 on one side of substrate 201 is demultiplexed into a plurality of single-channel optical signals by arrayed waveguide grating 211. The demultiplexed optical signals are outputted via corresponding waveguides 215a on the other side of substrate 201. Further, the received multiplexed optical signal is demultiplexed into a plurality of single-channel optical signals by arrayed waveguide grating 211 and outputted via corresponding waveguides 213a on one side of substrate 201.

Single-channel optical signals are respectively inputted to the above-described bi-directional wavelength division multiplexer/demultiplexer 200 via waveguides 213a on one side, multiplexed by arrayed waveguide grating 211, and outputted via multi-channel waveguide 413 on the other side. Similarly, single-channel optical signals are respectively inputted to the bi-directional wavelength division multiplexer/demultiplexer 200 via waveguides 215a on the other side, multiplexed by arrayed waveguide grating 211, and outputted via multi-channel waveguide 413 on one side.

Moreover, the above bi-directional wavelength division multiplexer/demultiplexer 200 can bi-directionally multiplex and demultiplex optical signals. This is due to the parallel arrangement of the plurality of waveguides 213a and 215a for inputting/outputting a single-channel optical signal and at least one multi-channel waveguide 413, on both sides of bi-directional wavelength division multiplexer/demultiplexer 200 centering on the arrayed waveguide grating 211.

Additionally, the aforementioned input waveguide 413 may be applied to a reflex diffraction grating as well as a planar lightwave circuit (PLC) used in a wavelength division multiplexer/demultiplexer.

Figure 6:
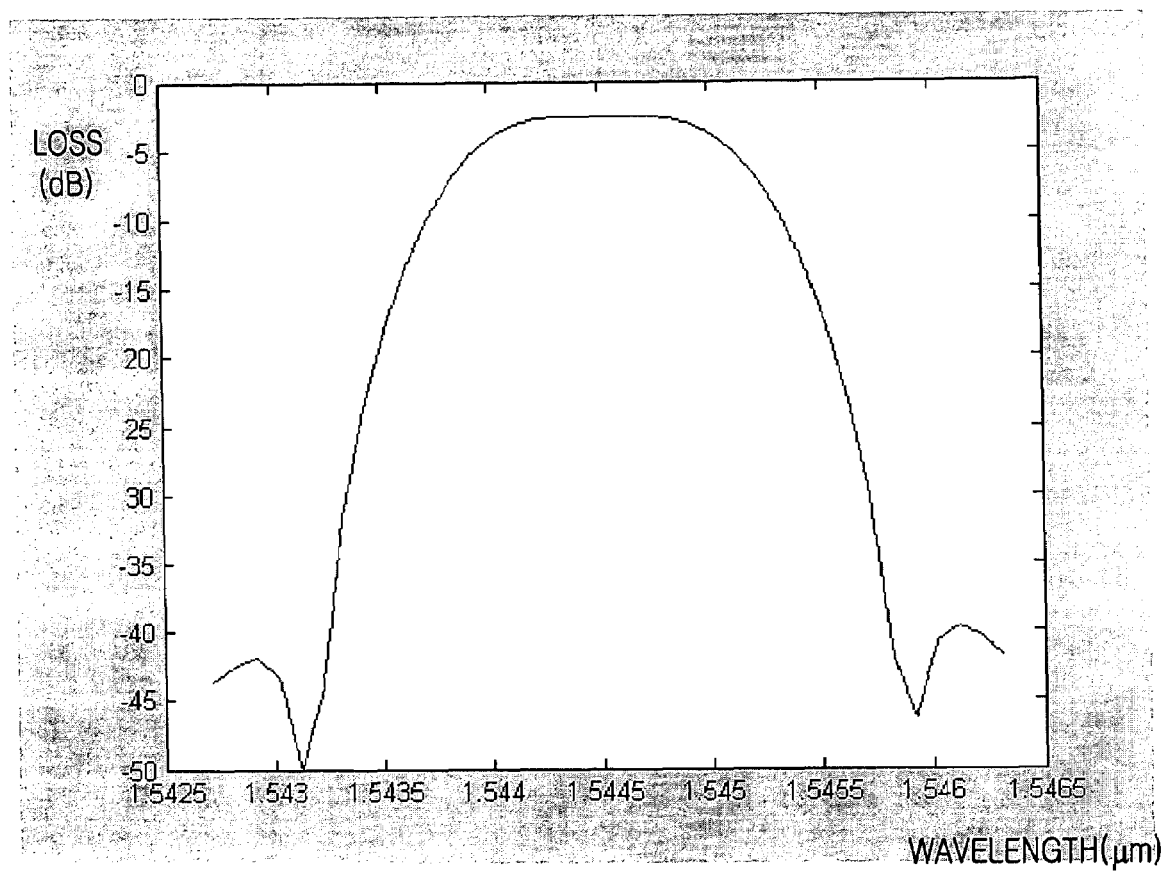
FIG. 6 is a graph illustrating the output characteristics of the input waveguide of the conventional wavelength division multiplexer/demultiplexer of FIG. 1.
Figure 7:
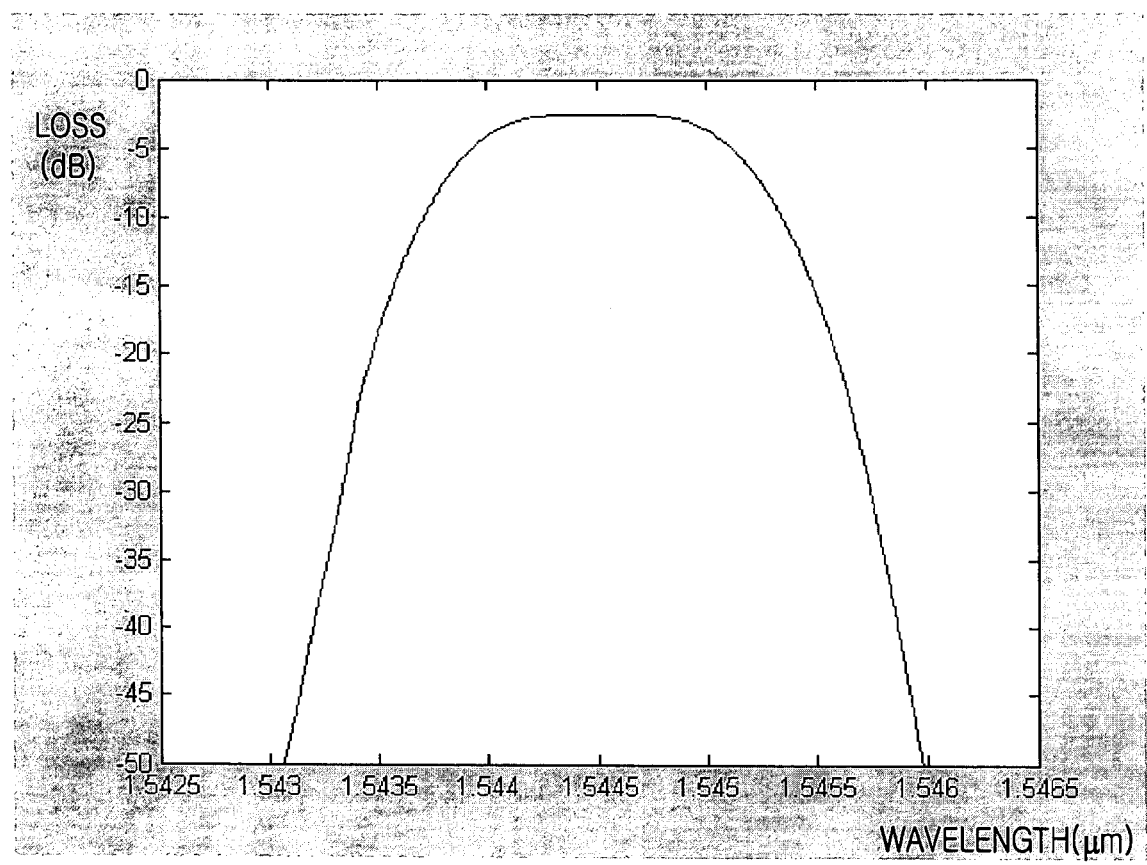
FIG. 7 is a graph illustrating the output characteristics of the input waveguide of the wavelength division multiplexer/demultiplexer of FIG. 2.
Figure 8:
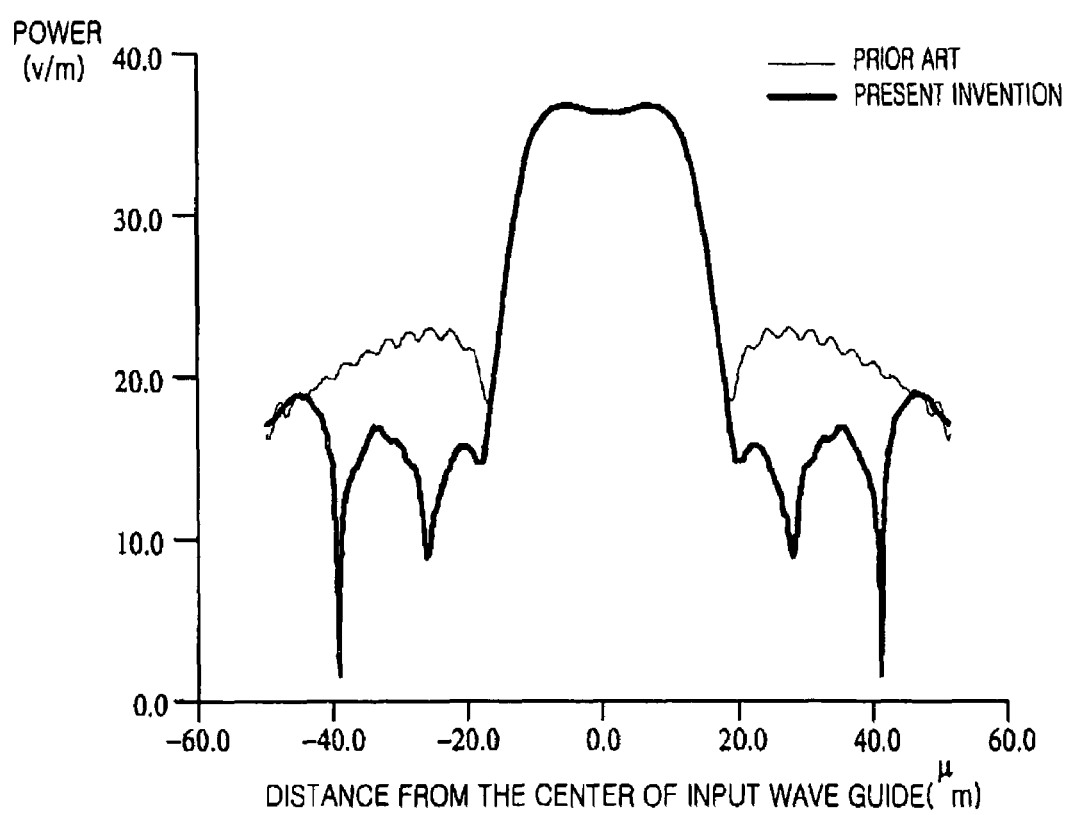
FIG. 8 is a graph comparatively illustrating the output characteristics of the input waveguides of the wavelength division multiplexers/demultiplexers of FIGS. 1 and 2.

Referring now to FIGS. 6 to 8, the spectrums of the optical signals, which are (1) inputted to the arrayed waveguide grating via conventional input waveguide 313 and input waveguide 413 of the present invention, (2) demultiplexed and (3) then outputted, will be described.

FIG. 6 is a graph illustrating a spectrum of optical signals obtained by inputting a multiplexed optical signal to the arrayed waveguide grating by conventional parabolic horn type input waveguide 313, in which its width is gradually increased in the progressing direction of the optical signal, demultiplexed and outputted. As shown in FIG. 6, when an optical signal having a center wavelength of 1544.5 μm is inputted to the arrayed wavelength grating via conventional input waveguide 313, a side lobe occurs at wavelength bands of approximately 1543 μm and approximately 1546 μm. Such a side lobe generation is due to the higher mode, and also occurs in first sub-waveguide 413a of the present invention.

The optical signal having the spectrum shown in FIG. 6 by progressing along first sub-waveguide 413a is coupled from the higher mode to the fundamental mode within second sub-waveguide 413b. Consequently, the side lobe is reduced.

FIG. 7 is a graph illustrating a spectrum of optical signals obtained by inputting the multiplexed optical signal to the arrayed waveguide grating via second sub-waveguide 413b defined by the above Equation 5, demultiplexing and outputting them. Comparing to the optical signal spectrum of FIG. 6 and FIG. 7, it is apparent that the side lobe is greatly reduced in the optical signal spectrum obtained by means of input waveguide 413 of the present invention (i.e. FIG. 7).

FIG. 8 is a graph showing the respective field profiles of the optical signal inputted to the arrayed waveguide grating via conventional input waveguide 313 and input waveguide 413 of the present invention. As shown in FIG. 8, the side lobe is generated at positions deviated from the center of the input waveguide by approximately ±18 μm in both optical signals progressing along conventional input waveguide 313 and input waveguide 413 of the present invention. Compared to the optical signal progressing along conventional input waveguide 313, the optical signal of the present invention has the same bandwidth but a reduced side lobe. Particularly, the side lobe generated at positions deviated from the center of input waveguide 413 by ±24 μm, being adjacent to neighboring channels, is reduced by about 5 dB. The reduction of the side lobe decreases an interference effect of the optical signal with the neighboring channels.

As is apparent from the above description, the present invention provides a wavelength division multiplexer/demultiplexer comprising an input waveguide of a shape such that its width is gradually increased in a progressing direction of an optical signal to a designated distance and then gradually decreased in the progressing direction of the optical signal. Therefore, since the inputted optical signal within the increased portion of the input waveguide has an expended bandwidth and the inputted optical signal within the decreased portion of the input waveguide has a reduced side lobe, the wavelength division multiplexer/demultiplexer of the present invention prevents an interference effect generated between neighboring channels. As a result, the present invention improves the quality of the optical signal transmitted and received in a wavelength division multiplexed (WDM) optical communication network.

Although only a few embodiments of the present invention have been described in detail, those skilled in the art will appreciate that various modifications, additions, and substitutions to the specific elements are possible, without departing from the scope and spirit of the invention as disclosed in the accompanying claims.

What is claimed is:

1. A wavelength division multiplexer/demultiplexer comprising:
   a first sub-waveguide having a width that gradually increases in a progressing direction of an optical signal; and
   a second sub-waveguide having a width that gradually decreases in the progressing direction of the optical signal passing through the first sub-waveguide, wherein a shape of the second sub-waveguide is defined by the Equation 9, $$W_2 = (W_{i2}^2 - 2\alpha\lambda_g z_2)^{1/2}, \alpha = -\frac{8\pi\gamma}{3}, \quad \text{[Equation 9]}$$

wherein, $z_2$ denotes a distance from the end of the first sub-waveguide to a position of a progressing optical signal, $W_2$ is a width of the second sub-waveguide at the position of the progressing optical signal, $W_{i2}$ is a width of the second sub-waveguide at the contact point of the first and second sub-waveguides, $\lambda_g$ denotes an effective wavelength of the optical signal, and $\gamma$ denotes a coupling coefficient of the fundamental and higher modes of the optical signal.

2. The wavelength division multiplexer/demultiplexer as set forth in claim 1, wherein a shape of the second sub-waveguide is defined by the following equation:

$$W_2 = \gamma\left[1 - \exp\left(\frac{-z_2}{\alpha}\right)\right] + W_{i2}, \alpha = -\frac{8\pi\gamma}{3}$$

wherein, $z_2$ denotes a distance from the end of the first sub-waveguide to a position of a progressing optical signal, $W_2$ is a width of the second sub-waveguide at the position of the progressing optical signal, $W_{i2}$ is a width of the second sub-waveguide at the contact point of the first and second sub-waveguides, and $\gamma$ denotes a coupling coefficient of the fundamental and higher modes of the optical signal.

3. The wavelength division multiplexer/demultiplexer as set forth in claim 1, wherein a shape of the second sub-waveguide is defined by the following equation:

$$W_2 = 2\alpha z_2 + W_{i2}, \alpha = -\frac{8\pi\gamma}{3}$$

wherein, $z_2$ denotes a distance from the end of the first sub-waveguide to a position of a progressing optical signal, $W_2$ is a width of the second sub-waveguide at the position of the progressing optical signal, $W_{i2}$ is a width of the second sub-waveguide at the contact point of the first and second sub-waveguides, and $\gamma$ denotes a coupling coefficient of the fundamental and higher modes of the optical signal.

4. A wavelength division multiplexer/demultiplexer for use in a planar lightwave circuit (PLC) having an arrayed waveguide grating including a plurality of optical waveguides, an input waveguide for inputting a multiplexed optical signal to the grating, and output waveguides for outputting single-channel optical signals demultiplexed by the grating, the wavelength division multiplexer/demultiplexer comprising:
   an input waveguide having, a first sub-waveguide, whose width gradually increases in a progressing direction of the optical signal such that, starting at an input of the sub-waveguide and with the gradual increase, tapering of the sub-waveguide is directed inwardly in a concave manner; and
   a second sub-waveguide, continuously joined to the first sub-waveguide, whose width gradually decreases in the progressing direction of the optical signal passing through the first sub-waveguide, wherein the input waveguide,
   comprising the first and second sub-waveguides, is respectively disposed on both sides of the substrate centering on the arrayed wave guide grating, and the output waveguides arranged in parallel with the input waveguide are respectively disposed on both sides of the substrate centering on the arrayed waveguide grating.

5. The wavelength division multiplexer/demultiplexer as set forth in claim 4, wherein the first sub-waveguide has a parabolic horn shape.

6. The wavelength division multiplexer/demultiplexer as set forth in claim 4, wherein the second sub-waveguide has a predetermined shape having a width that linearly decreases in the progressing direction of the optical signal passing through the first sub-waveguide.

7. The wavelength division multiplexer/demultiplexer as set forth in claim 4, wherein the second sub-waveguide has a parabolic horn shape having a width that gradually decreases in the progressing direction of the optical signal passing through the first sub-waveguide.

* * * * *